United States Patent [19]

Virdi

[11] Patent Number: 6,162,875
[45] Date of Patent: Dec. 19, 2000

[54] LOW NITROSAMINE SYSTEMS FOR RUBBER VULCANIZATION

[75] Inventor: Ranvir Singh Virdi, Birmingham, United Kingdom

[73] Assignee: Robinson Brothers Limited, United Kingdom

[21] Appl. No.: 08/442,633

[22] Filed: May 17, 1995

Related U.S. Application Data

[63] Continuation of application No. 08/120,041, Sep. 10, 1993, abandoned.

[30] Foreign Application Priority Data

Sep. 16, 1992 [GB] United Kingdom .................. 9219618

[51] Int. Cl.$^7$ .................................................. C08C 19/20
[52] U.S. Cl. ............................................................. 525/351
[58] Field of Search ............................................. 525/352

[56] References Cited

U.S. PATENT DOCUMENTS

| | | | |
|---|---|---|---|
| 3,674,824 | 7/1972 | Amidon | 525/352 |
| 3,678,135 | 7/1972 | Mastromatteo | 525/352 |
| 5,158,805 | 10/1992 | Preussmann et al. | 427/220 |

FOREIGN PATENT DOCUMENTS

| | | | |
|---|---|---|---|
| 694611 | 9/1994 | Canada . | |
| 0165005 | 12/1985 | European Pat. Off. | C08K 5/39 |
| 184301 | 6/1986 | European Pat. Off. | C08K 5/38 |
| 284649 | 10/1988 | European Pat. Off. | C08K 5/40 |
| 284650 | 10/1988 | European Pat. Off. | C08K 5/40 |
| 406603 | 1/1991 | European Pat. Off. | C08L 23/16 |
| 455009 | 11/1991 | European Pat. Off. | C08K 9/02 |
| 463465 | 1/1992 | European Pat. Off. | C08K 5/17 |
| 0479526 | 4/1992 | European Pat. Off. | C08K 5/40 |
| 0562750 | 9/1993 | European Pat. Off. | C08K 5/00 |
| 3243141 | 4/1986 | Germany | C08L 23/16 |
| 4027114 | 3/1991 | Germany | C08L 21/00 |

OTHER PUBLICATIONS

W. Lijinsky et al., Ecotoxicology and Environmental Safety, vol. 2, pp. 407–411 (1978).

C.D. Wacker et al., "Relevance to Human Cancer of N–Nitroso Compounds, Tobacco Smoke and Mycotoxins", Editors: O'Neill et al., IARC Publication 1991, pp. 592–594.

*Primary Examiner*—Christopher Henderson
*Attorney, Agent, or Firm*—Ohlandt, Greeley, Ruggiero & Perle, LLC; George W. Rauchfuss, Jr.

[57] ABSTRACT

A metal dialkyldithiocarbamate or other such compound including a group of the formula $R_2NCS-$ or $R_2NS-$ is useful as a rubber accelerator/vulcanizing agent, wherein each R is $C_{5-18}$ branched alkyl.

10 Claims, No Drawings

LOW NITROSAMINE SYSTEMS FOR RUBBER VULCANIZATION

This Application is a continuation of application Ser. No. 08/120,041, filed Sep. 10, 1993 now abandoned.

FIELD OF THE INVENTION

The invention relates to compositions and processes adapted to minimise nitrosamine hazards during the manufacture and use of rubber goods.

BACKGROUND OF THE INVENTION

It is now recognised that some of the nitrogenous chemicals, many of them accelerators, used in processing rubber can generate nitrosamines, many of which are powerful carcinogens. Typical such chemicals include morpholino(di)thiobenzthiazole, dithiomorpholine, tetramethylthiuram disulphide and zinc dimethyldithiocarbamate. They give rise to 4-nitrosomorpholine and dimethylnitrosamine, both of which are subject to regulation in some countries.

Various approaches have been adopted, with a view to reducing the occurrence of such hazardous nitrosamines. For example, in some cases rubber can be vulcanised without using nitrogenous chemicals, e.g. by means of diisopropylxanthogen disulphide activated by zinc isopropyl xanthate; see EP-A-0184301. Another approach is to use chemicals based on amines which do not form carcinogenic nitrosamines, e.g. zinc dibenzyl dithiocarbamate, tetrabenzylthiuram di- and tetra-sulphides (see EP-A-0284649, EP-A-0284650, DE-A-4027114 and EP-A-0406603) or derivatives of amines lacking a labile hydrogen on the α-carbon atom (Spiegelhalder). A further approach is to include nitrosamine decomposers in the processing stages. Such decomposers are typically primary amines, ammonia or ascorbic acid; see EP-A-0455009 and EP-A-0463465.

These approaches have certain disadvantages. For example, in the case of xanthogen sulphides, a nitrogenous co-agent is often essential to achieve satisfactory vulcanisate properties. Amines which form non-carcinogenic nitrosamines do so because of their particular structures and these same structures are disadvantageous as regards accelerator action in rubber. Nitrosamine decomposers can easily become separated from the nitroso-species they are intended to destroy, and thus lose their effect.

SUMMARY OF THE INVENTION

The present invention is based on the discovery of accelerators for rubber which are more effective than those derived from non-carcinogen-forming amines, are derived from amines which can give a nitrosamine negative in the Ames test, and which are highly soluble in rubbers, thus minimising the access of nitrosating agents to the amine and the transfer of the amine and/or nitrosamine out of the rubber into media (e.g. the workplace atmosphere, contacting fluids) where human contact is more likely. A concomitant influence on the low availability of amine and/or nitrosamine is the low volatility of both compounds.

The accelerators of the invention are derived from di(branched alkyl)amines of the type $R_2NH$. These accelerators have a group of the formula $R_2NCS-$  or $R_2NS-$. R has 5–18, preferably 6–15, C atoms. Most preferably, the amine is the readily commercially-available di($C_9$ alkyl)-amine which consists mainly of the branched amine di(3,5, 5-trimethylhexyl)amine, hereafter described for convenience as diisononylamine.

It has surprisingly been found that accelerators based on such amines have powerful accelerating action when compared with conventional accelerators, both on a weight-to-weight basis and on a mole-to-mole basis.

DESCRIPTION OF THE INVENTION

Preferred accelerators for use in the invention are dithiocarbamates of formula I $$(R_2NCSS)_nM \qquad\qquad I$$

where M is a metal such as zinc or copper (n=2), iron or bismuth (n=3), sodium or potassium (n =1), or tellurium (n=4). Analogous accelerator compounds which can be utilised within the scope of the invention are the corresponding amine salts, i.e. of formula I where M is diisononylamine, dibenzylamine or another non-carcinogenic amine, a trialkylamine such as triethylamine which gives nitrosamines only under drastic conditions, or a primary amine which forms an unstable non-carcinogenic nitrosamine (in all cases n=1).

Other accelerators for use in the invention are the corresponding thiuram sulphides of the formula $$R_2NCS(S)_xCSNR_2 \text{ (x=1, 2 or 3 or up to 6)}$$

the corresponding thioureas of the formula $$R_2NCSNR'R''$$ 

where R' and R" are the same as R or R' may be hydrogen and R" any convenient alkyl, cycloalkyl or aralkyl group such as methyl, ethyl, butyl, benzyl or cyclohexyl, and the corresponding mixed sulphides of the formula $$R_2NCS.S_yR'''$$ 

where y can be 1 or 2 and R''' is a residue of 2-mercaptobenzthiazole, 2-mercaptothiazoline or the like.

Other accelerators suitable for use in the invention include dithiodiisononylamine, S-(diisononylthiocarbamyl) O,O-dialkyldithiophosphates, salts of diisononylamine with O,O-dialkyldithiophosphates and diisononylamine complexes of zinc or copper dialkyldithiophosphates.

A composition of the invention comprises rubber and, say, 0.1 to 5%, by weight of the composition, of the accelerator. Conventional additives may also be present. Sulphur may also be included. Additives and types of rubber that may be used are described in EP-A-0184301.

In order to demonstrate the non-carcinogenic nature of derivatives of compounds used in the present invention, N-nitrosodiisononylamine, N-nitrosodibenzylamine and zinc diisononyldithiocarbamate were tested for mutagenicity via the Ames test. In a preliminary test for toxicity to the bacterial strains TA 1535, TA 1537, TA 1538, TA 98 and TA 100, all three compounds were non-toxic at doses up to and including 5000 μg/plate, although precipitates were observed with all strains with nitrosodibenzylamine and zinc diisononyldithiocarbamate at the 5000 μg dose. Relevant colony counts were determined at doses of 0, 50, 150, 500, 1500, 5000 μg/plate, with and without metabolic activation, and no increase of revertant colony counts over control values was recorded for any of the five test doses on the five bacterial strains.

In tests to check the mutability of the bacterial strains, dimethylnitrosamine at 4000 μg/plate was mutagenic after metabolic activation to TA 1535 and TA 100. N-ethyl-N'-nitro-N-nitrosoguanidine was weakly mutagenic to TA 1535 at 5.0 μg/plate and to TA 100 at 5.0 μg/plate, both without metabolic activation.

The following Examples illustrate the invention.

EXAMPLES 1 TO 4

Metal diisononyldithiocarbamates of formula I (M=Zn, n=2; M=Bi, n=3; M=Fe, n=3; M=Cu, n=2) were prepared from diisononylamine and tested as accelerators in natural rubber, respectively as Examples 1 to 4. The formulation used was:

|  | Parts by Weight |
| --- | --- |
| Natural Rubber SMR CV | 100.0 |
| Zinc oxide | 5.0 |
| Stearic acid | 1.0 |
| Antioxidant WSP | 1.0 |
| Activated calcium carbonate | 50.0 |
| SRF Black | 5.0 |
| Sulphur | 2.5 |
| Accelerator | 0.8 |

At 160° C., Monsanto rheographs showed that all 4 accelerators were satisfactory. The Theological data were as follows:

| Example | 1 | 2 | 3 | 4 |
| --- | --- | --- | --- | --- |
| Time to two point rise (min) | 2.04 | 0.5 | 1.52 | 1.07 |
| Time to 50% cure (min) | 2.52 | 1.28 | 2.49 | 1.54 |
| Time to 90% cure (min) | 5.40 | 4.17 | 4.0 | 4.19 |
| Max. torque (kg.cm) | 32.5 | 36.6 | 49.1 | 37.3 |
| Time to highest cure rate (min) | 2.26 | 1.22 | 2.34 | 1.42 |
| Highest cure rate ($R_H$) | 0.24 | 0.30 | 0.39 | 0.26 |

EXAMPLE 5

The same natural rubber formulation as in Example 1 was used, except that sulphur was omitted, and the metal diisononyldithiocarbamate was replaced by 3 parts by weight of tetraisononylthiuram tetrasulphide as vulcanisation agent. The resultant rheograph showed that tetraisononylthiuram tetrasulphide ($R_2NCSS_4CSNR_2$) will cure natural rubber, albeit not quite as effectively as the metal diisononyldithiocarbamate/sulphur systems.

EXAMPLE 6

Zinc diisononyldithiocarbamate and zinc dibutyldithiocarbamate were compared in cast latex films prepared from the following formulations:

Base mix:
60% High ammonia latex 167.00
30% Potassium caprylate solution 0.67
20% Potassium hydroxide solution 1.00
60% Sulphur dispersion 2.50

The base mix was compounded with:
 A. 0.50 pphr zinc diisononyldithiocarbamate
 B. 1.00 pphr zinc diisononyldithiocarbamate
 C. 0.50 pphr zinc dibutyldithiocarbamate Samples of films A, B and C, as well as a sample of dried base mix, D, were analysed for nitrosamines and nitrosatable amines by GC/TEA using both F.D.A. and B.G.A. methods of extraction. Using dichloromethane extraction as in the F.D.A. method, only N-nitrosodibutylamine was detected, as follows:
A. 21.7 ppb; B. 31.0 ppb; C. 335.0 ppb; D. 26.6 ppb Clearly, the base mix is contaminated with a small amount of N-nitrosodibutylamine and substantial amounts of N-nitrosodibutylamine originate from the zinc dibutyldithiocarbamate accelerator.

Using artificial saliva extraction as in the B.G.A. method, more contaminating nitrosamines were detected (n.d.=not detectable):

|  | A | B | C | D |
| --- | --- | --- | --- | --- |
| N-nitrosodimethylamine (NDMA) | n.d. | 1.1 | n.d. | 1.2 |
| N-nitrosodiethylamine (NDEA) | n.d. | n.d. | n.d. | n.d. |
| N-nitrosodibutylamine (DNBA) | 4.9 | 7.5 | 83.0 | 4.4 |
| N-nitrosopiperidine (NPIP) | 0.7 | 1.3 | n.d. | 0.8 |
| N-nitrosomorpholine (NMOR) | 4.7 | 4.1 | 4.5 | 5.0 |
| N-nitrosodiisononylamine (NDisoNA) | n.d. | n.d. | n.d. | n.d. |

When the artificial saliva extracts were nitrosated to determine nitrosatable amines, the results were:

|  | A | B | C | D |
| --- | --- | --- | --- | --- |
| NDMA | n.d. | 91.4 | 4.7 | 33.9 |
| NDEA | n.d. | 6.1 | 3.5 | 1.9 |
| NDBA | 172.0 | 84.3 | 3210.0 | 40.8 |
| NPIP | n.d. | n.d. | n.d. | n.d. |
| NMOR | 3.3 | n.d. | 4.5 | n.d. |
| NDisoNA | n.d. | n.d. | n.d. | n.d. |

The results show that, while zinc dibutyldithiocarbamate contributes both nitrosodibutylamine and dibutylamine to extracts of films cured with it, zinc diisononyldithiocarbamate does not release nitrosodiisononylamine or its diisononylamine precursor in amounts greater than 1 ppb (which is the limit of detection of nitrosodiisononylamine with this instrumentation). It should be noted also that the results demonstrate contamination by other nitrosamines, which emphasises the reality of the problem that the invention seeks to solve.

What I claim is:

1. A method for minimizing the production of nitrosamines in the vulcanisation of rubber, the improvement comprising incorporating an accelerating or vulcanising effective amount of a compound including a group of the formula $R_2NCS$— or $R_2NS$—, wherein the two R groups are identical $C_9H_{19}$ branched alkyl.

2. A method according to claim 1 wherein each R is 3,5,5-trimethylhexyl.

3. A method according to claim 1, wherein said compound is a dithiocarbamate, thiuram sulphide, thiourea or mixed sulphide.

4. A method according to claim 3, wherein said compound is a metal dialkyldithiocarbamate.

5. A method according to claim 4, wherein said metal is copper, bismuth, sodium, tellurium or zinc.

6. A method according to claim 5, wherein said compound is zinc diisononyldithiocarbamate.

7. A method according to claim 1, wherein said compound is incorporated in an amount of 0.1–5% by weight.

8. A method according to claim 1, which additionally comprises incorporating sulfur.

9. A method for minimizing the production of nitrosamines in the vulcanisation of a rubber composition, the improvement comprising incorporating from about 0.1 to about 5% by weight of the composition of a compound of the formula $(R_2NCSS)_nM$ wherein M is a metal selected from the group consisting of zinc, copper, iron, bismuth, sodium, potassium, tellurium, n is an integer of from 1 to 4 and equal to the valence of M, and the two R groups are identical $C_9$ branched alkyl groups.

10. A method according to claim 9 wherein the compound is zinc diisononyldithiocarbamate.

* * * * *